United States Patent
Hasegawa et al.

(10) Patent No.: US 10,854,867 B2
(45) Date of Patent: Dec. 1, 2020

(54) STACKED BATTERY

(71) Applicant: TOYOTA JIDOSHA KABUSHIKI KAISHA, Toyota (JP)

(72) Inventors: Hajime Hasegawa, Susono (JP); Norihiro Ose, Sunto-gun (JP); Hideaki Nishimura, Sunto-gun (JP); Yuki Matsushita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 16/394,592

(22) Filed: Apr. 25, 2019

(65) Prior Publication Data
US 2019/0348663 A1 Nov. 14, 2019

(30) Foreign Application Priority Data

May 9, 2018 (JP) .................... 2018-090878

(51) Int. Cl.
*H01M 2/34* (2006.01)
*H01M 10/04* (2006.01)
*H01M 10/0525* (2010.01)

(52) U.S. Cl.
CPC ......... *H01M 2/34* (2013.01); *H01M 10/0431* (2013.01); *H01M 10/0525* (2013.01);
(Continued)

(58) Field of Classification Search
None
See application file for complete search history.

(56) References Cited

U.S. PATENT DOCUMENTS

2016/0006013 A1 1/2016 Shen et al.
2018/0294468 A1* 10/2018 Hasegawa ............... H01M 2/34
(Continued)

FOREIGN PATENT DOCUMENTS

JP 2001-068156 A 3/2001
JP 2015-018710 A 1/2015
(Continued)

*Primary Examiner* — Scott J. Chmielecki
(74) *Attorney, Agent, or Firm* — Sughrue Mion, PLLC

(57) ABSTRACT

To suppress heat generation in a short-circuit current shunt part in a stacked battery that includes the short-circuit current shunt part, in the stacked battery 100 including at least one short-circuit current shunt part 10, and a stack 20 that includes a plurality of electric elements 20a, 20b which are stacked, the short-circuit current shunt part 10 includes a first part 10a that is provided on one end side in a stacking direction of the stack 20, a second part 10b that is provided on another end side therein, and a third part 10c that connects the first part 10a and the second part 10b; at the first part 10a, the first current collector layer 11 and the cathode current collector layer 21 have an electric connection part 14a but the second current collector layer 12 and the anode current collector layer 25 do not have any electric connection part, at the second part 10b, the second current collector layer 12 and the anode current collector layer 25 have an electric connection part 14b but the first current collector layer 11 and the cathode current collector layer 21 do not have any electric connection part, and at the third part 10c, the short-circuit current shunt part 10 and the stack 20 do not have any electric connection part.

6 Claims, 8 Drawing Sheets

(52) U.S. Cl.
CPC ........ *H01M 2/347* (2013.01); *H01M 2200/00* (2013.01); *H01M 2200/20* (2013.01)

(56) References Cited

U.S. PATENT DOCUMENTS

| | | | |
|---|---|---|---|
| 2018/0294469 A1* | 10/2018 | Hasegawa | H01M 10/0468 |
| 2018/0294470 A1* | 10/2018 | Hasegawa | H01M 10/0585 |
| 2018/0294471 A1* | 10/2018 | Hasegawa | H01M 10/0585 |
| 2018/0315984 A1* | 11/2018 | Hasegawa | H01M 2/26 |
| 2019/0140311 A1* | 5/2019 | Hasegawa | H01M 10/4235 |
| 2019/0207223 A1* | 7/2019 | Zhou | H01M 10/0431 |
| 2019/0245190 A1* | 8/2019 | Watanabe | H01M 10/0413 |
| 2019/0319252 A1* | 10/2019 | Hasegawa | H01M 10/0413 |

FOREIGN PATENT DOCUMENTS

| | | |
|---|---|---|
| JP | 6027262 B2 | 11/2016 |
| JP | 2018-181462 A | 11/2018 |
| JP | 2018-190522 A | 11/2018 |

\* cited by examiner

Fig. 5A    Technique of present disclosure
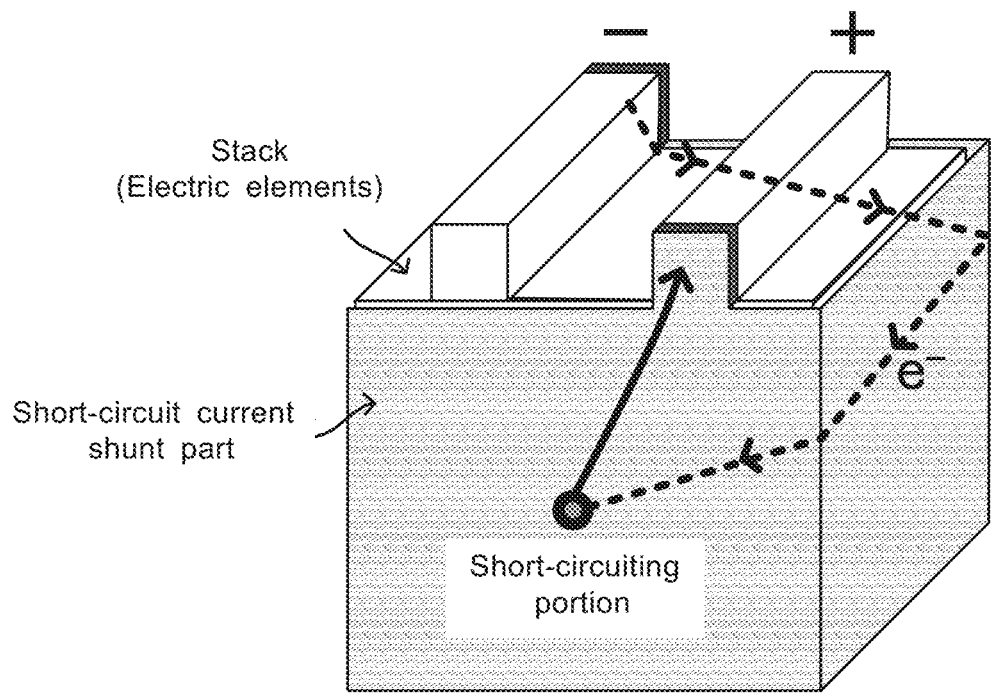
Fig. 5B    Prior art
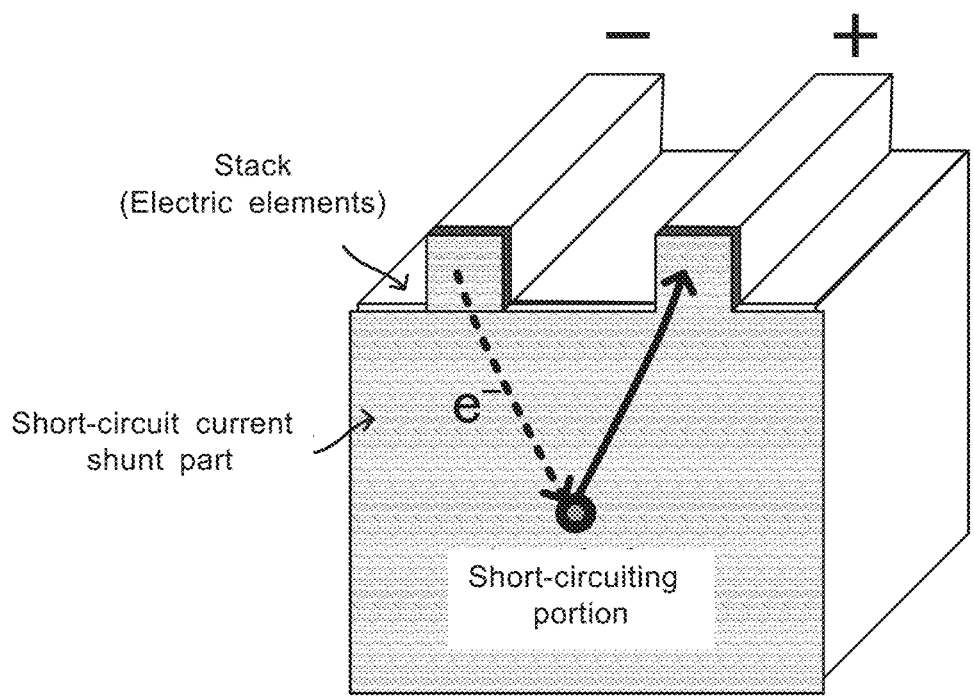

STACKED BATTERY

FIELD

The present application discloses a stacked battery.

BACKGROUND

A nail penetration test of running and penetrating a conductive nail through a battery and observing a temperature increase etc. when internal short circuits occur inside an electric element is known as a test for evaluating safety of a battery. Patent Literature 1 discloses a battery provided with a short-circuiting and heat radiation accelerating unit that is formed by arranging two metal plates via an insulator, on the outermost layer of art electric element in Patent Literature 1, the short-circuiting and heat radiation accelerating unit is short-circuited prior to the electric element in nail penetration through the battery, and discharge of the electric element is advanced before the electric element short-circuits, which results in suppression of heat generation inside the battery. Patent Literatures 2 and 3 disclose similar techniques.

CITATION LIST

Patent Literature

Patent Literature 1: JP 2001-068156 A
Patent Literature 2: JP 2015-018710 A
Patent Literature 3: JP 6027262 B2

SUMMARY

Technical Problem

Seen from the techniques disclosed in Patent Literatures 1 to 3, it is believed that current from electric elements (rounding current) can be passed through a short-circuit current shunt part (a part that causes a short-circuit current to divide and flow thereinto when electric elements and the short-circuit current shunt part short-circuit) and discharge of the electric elements is advanced to make it possible to suppress heat generation inside a battery by providing the short-circuit current shunt part including a conducting layer and an insulating layer in the stacked battery separately from the electric elements, and short-circuiting the short-circuit current shunt part first when stress such as nail penetration is applied (FIG. 8A). Also, such a problem is easy to arise that in a stacked battery including a plurality of stacked electric elements, when electric elements are short-circuited by application of stress such as nail penetration, current flows from some electric elements into the other electric elements, which results in a local temperature increase in some electric elements. For this, it can be believed to be prevented that only the temperature of some electric elements locally increases by providing a short-circuit current shunt part separately from electric elements, and short-circuiting both some electric elements and the short-circuit current shunt part when stress such as nail penetration is applied to shunt a rounding current from the electric elements of a higher shunt resistance to not only the electric elements of a lower shunt resist, but also the short-circuit current shunt part, which has a low shunt resistance (FIG. 8B). While a short-circuit current shunt part can suppress heat generation of electric elements as described above, there is room for improvement in suppression of heat generation of a short-circuit current shunt part itself.

Solution to Problem

The present application discloses, as one means for solving the problem, a stacked battery comprising at least one short-circuit current shunt part, and a stack that comprises a plurality of electric elements which are stacked, wherein the short-circuit current shunt part comprises a first current collector layer, a second current collector layer, and an insulating layer provided between the first current collector layer and the second current collector layer, all of the layers being stacked, each of the electric elements comprises a cathode current collector layer, a cathode material layer, an electrolyte layer, an anode material layer, and an anode current collector layer, all of the layers being stacked, said at least one short-circuit current shunt part has a first part that is provided on one end side in a stacking direction of the stack, a second part that is provided on another end side in the stacking direction of the stack, and a third part that connects the first part and the second part, at the first part, the first current collector layer and the cathode current collector layer have an electric connection part but the second current collector layer and the anode current collector layer do not have any electric connection part, at the second part, the second current collector layer and the anode current collector layer have an electric connection part but the first current collector layer and the cathode current collector layer do not have any electric connection part, and at the third part, the first current collector layer, the second current collector layer, the cathode current collector layer, and the anode current collector layer do not have any electric connection part.

In the stacked battery of this disclosure, preferably, said at least one short-circuit current shunt part includes a first tab at the first part, the first tab protruding from the first current collector layer, and a second tab at the second part, the second part protruding from the second current collector layer, each of the electric elements includes a cathode tab that protrudes from the cathode current collector layer, and an anode tab that protrudes from the anode current collector layer, at the first part, the first tab and the cathode tab are electrically connected to each other, and at the second part, the second tab and the anode tab are electrically connected to each other.

The stacked battery of this disclosure is preferably a solid-state battery.

In the stacked battery of this disclosure, the electrolyte layer preferably contains a sulfide solid electrolyte as a solid electrolyte.

In the stacked battery of this disclosure, a plurality of the electric elements are preferably electrically connected with each other in parallel.

In the stacked battery of this disclosure, the following directions are preferably the same: a direction of stacking the first current collector layer, the insulating layer, and the second current collector layer in the first part and the second part of the short-circuit current shunt part, a direction of stacking the cathode current collector layer, the cathode material layer, the electrolyte layer, the anode material layer, and the anode current collector layer in each of the electric elements, and the direction of stacking a plurality of the electric elements in the stack.

Advantageous Effects

According to the stacked battery of this disclosure, when a short-circuit current shunt part short-circuits due to nail penetration or the like and current flows from electric elements into the short-circuit current shunt part, heat generation of the short-circuit current shunt part can be suppressed more than before.

BRIEF DESCRIPTION OF DRAWINGS

FIG. 1A shows a scene where a first part 10a is on the front side; and FIG. 1B shows a scene where a second part 10b is on the front side;

FIG. 3A is an external perspective view and FIG. 3B is a cross-sectional view taken along the line IIIB-IIIB;

FIG. 4A is an external perspective view; and FIG. 4B is a cross-sectional view taken along the line IVB-IVB;

FIGS. 5A and 5B are explanatory schematic views for effect of the stacked battery 100: FIG. 5A shows a scene where the short-circuit current shunt part 10 short-circuits in the stacked battery 100; and FIG. 5B shows a scene where a short-circuit current shunt part short-circuits in a prior art;

DETAILED DESCRIPTION OF EMBODIMENTS

1. Stacked Battery 100

Figure 1A:
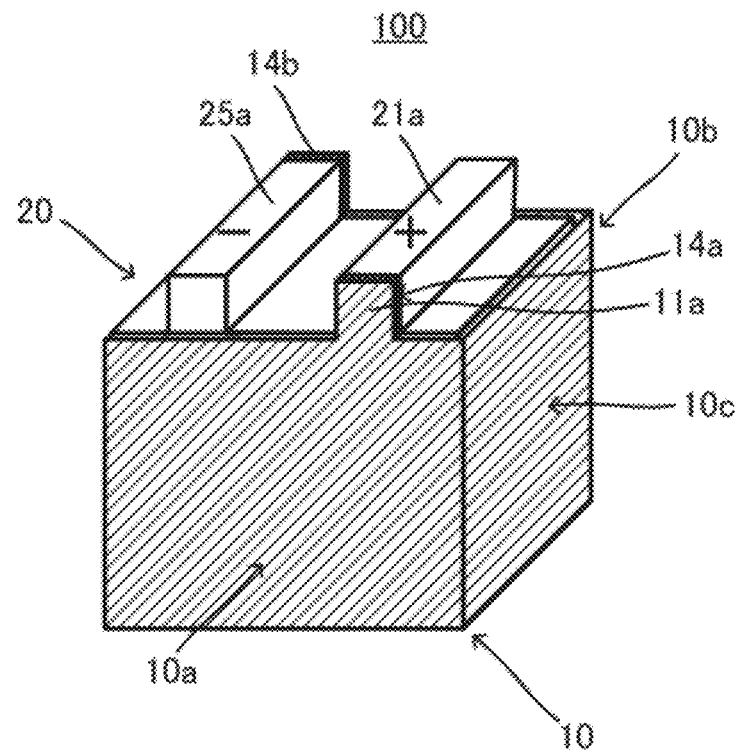
FIGS. 1A and 1B are explanatory schematic views of structure of a stacked battery 100.
Figure 1B:
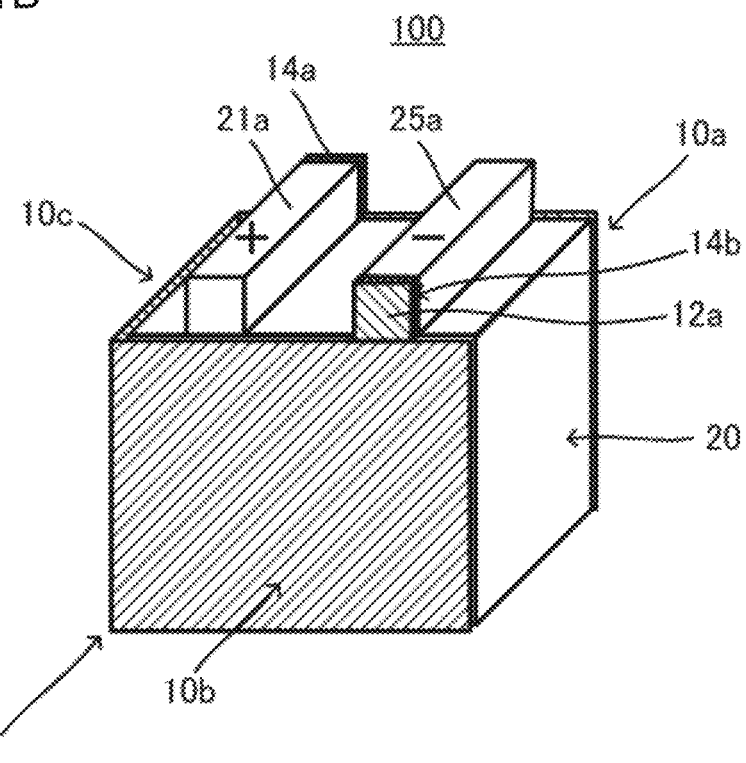
Figure 2:
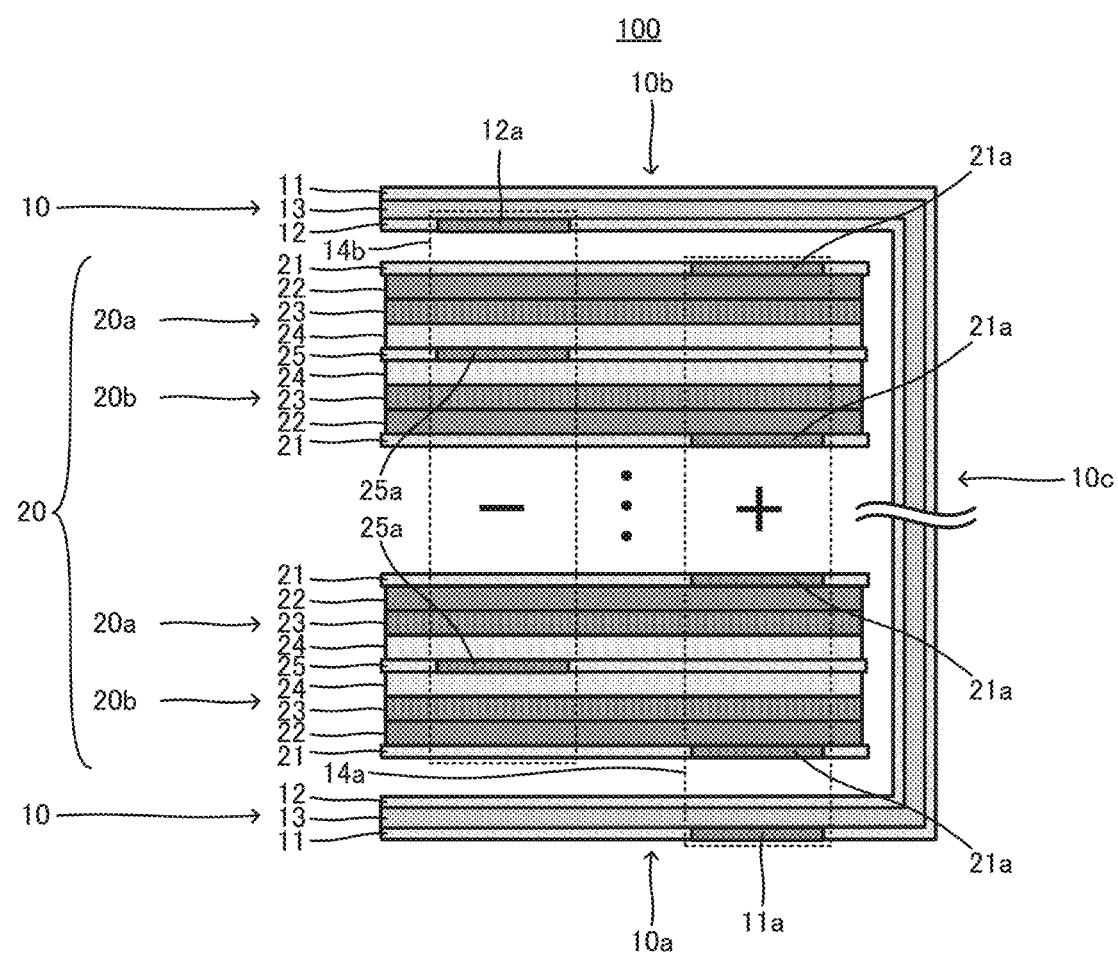
FIG. 2 is an explanatory schematic view of the structure of the stacked battery 100.
Figure 3A:
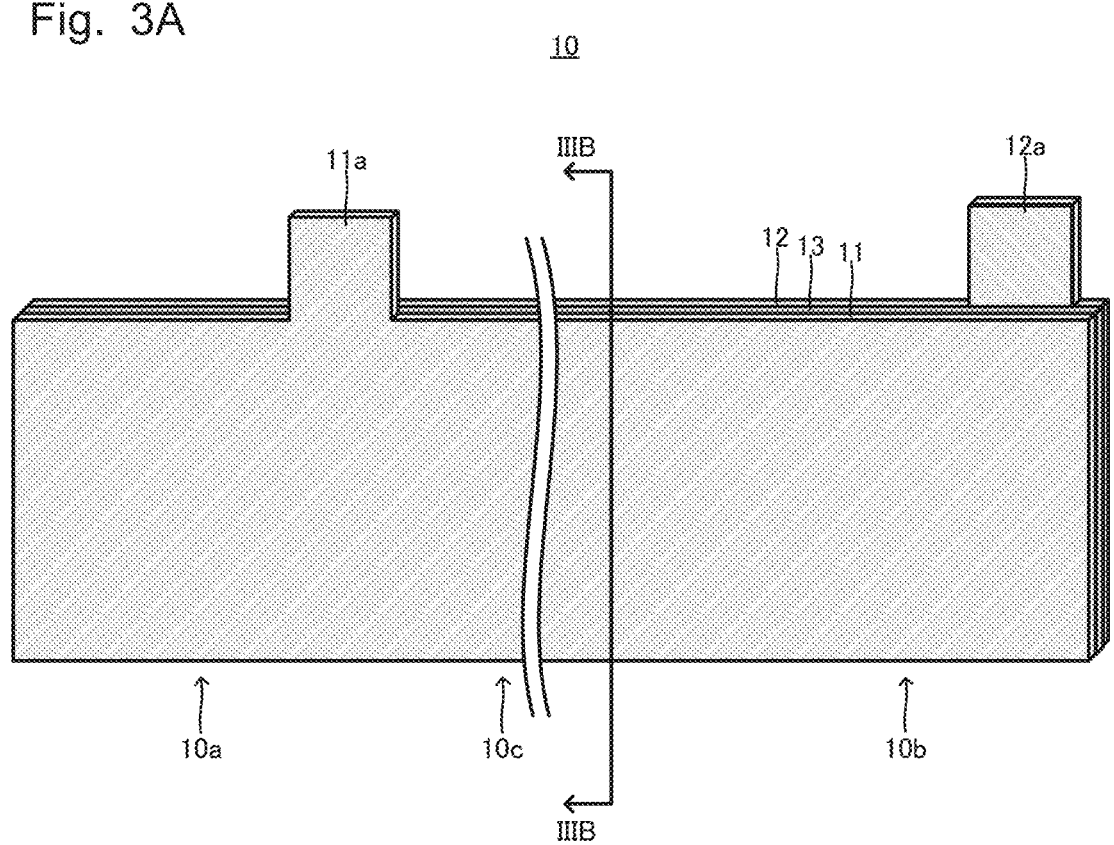
FIGS. 3A and 3B are explanatory schematic views of structure of a short-circuit current shunt part 10.
Figure 3B:
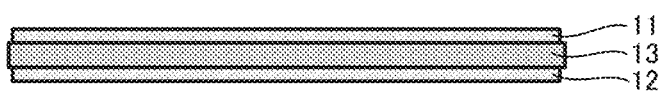
Figure 4A:
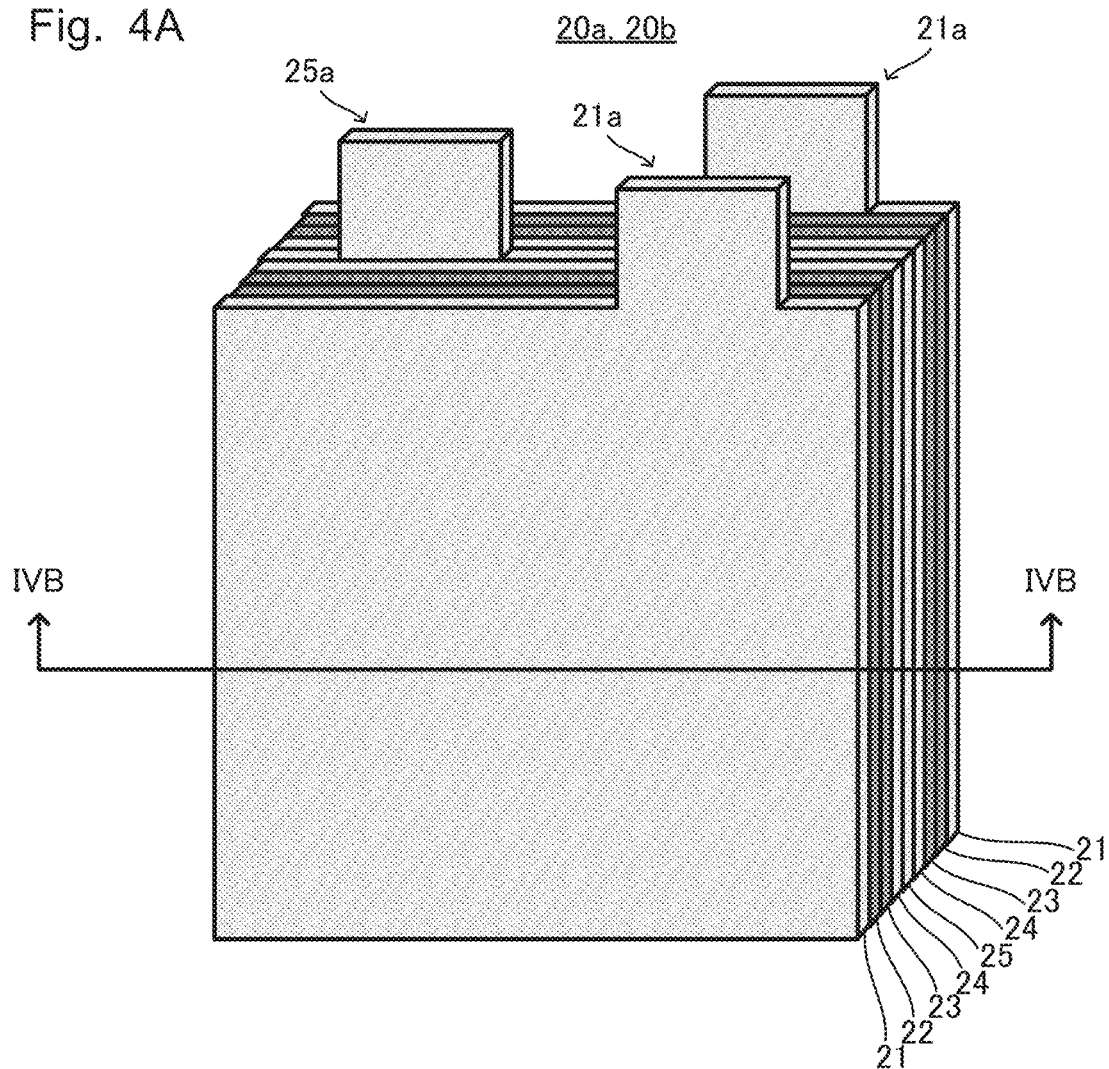
FIGS. 4A and 4B are explanatory schematic views of structure of electric elements 20a and 20B.
Figure 4B:
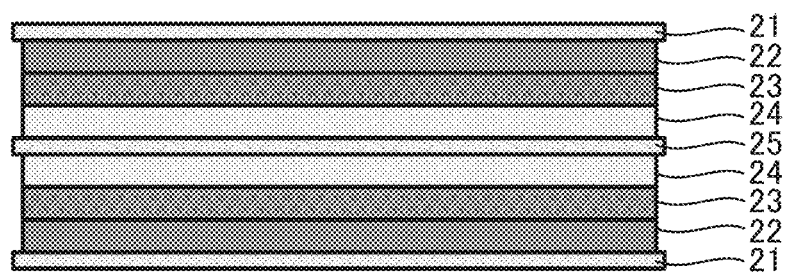

FIGS. 1A to 2 schematically show structure of a stacked battery 100. In FIGS. 1A to 2, a battery case etc. are omitted for convenient explanation. FIGS. 3A and 3B schematically show structure of a short-circuit current shunt part 10 that is a component of the stacked battery 100. FIG. 3A is an external perspective view (in a state where the short-circuit current shunt part 10 is opened) and FIG. 3B is a cross-sectional view taken along the line IIIB-IIIB. FIGS. 4A and 4B schematically show structure of electric elements 20a and 20b that are components of the stacked battery 100. FIG. 4A is an external perspective view and FIG. 4B is a cross-sectional view taken along the line IVB-IVB.

As shown in FIGS. 1A to 4B, the stacked battery 100 includes at least one short-circuit current shunt part 10, and a stack 20 including a plurality of the electric elements 20a and 20b which are stacked. As shown in FIGS. 2 to 3B, in the short-circuit current shunt part 10, a first current collector layer 11, a second current collector layer 12, and an insulating layer 13 that is provided between the first current collector layer 11 and the second current collector layer 12 are stacked. As shown in FIGS. 2, 4A and 4B, in each of the electric elements 20a and 20b, a cathode current collector layer 21, a cathode material layer 22, an electrolyte layer 23, an anode material layer 24, and an anode current collector layer 25 are stacked. As shown in FIGS. 1A to 3B, in the stacked battery 100, at least one short-circuit current shunt part 10 has a first part 10a that is provided on one end side in the stacking direction of the stack 20, a second part 10b that is provided on the other end side in the stacking direction of the stack 20, and a third part 10c that connects the first part 10a and the second part 10b. Here, at the first part 10a, while the first current collector layer 11 and the cathode current collector layers 21 have an electric connection part 14a, the second current collector layer 12 and the anode current collector layers 25 do not have any electric connection part. At the second part 10b, while the second current collector layer 12 and the anode current collector layers 25 have an electric connection part 14b, the first current collector layer 11 and the cathode current collector layers 21 do not have any electric connection part. Further, at the third part 10c, the first current collector layer 11, the second current collector layer 12, the cathode current collector layers 21, and the anode current collector layers 25 do not have any electric connection part.

1.1. Short-Circuit Current Shunt Part 10

Figure 8A:
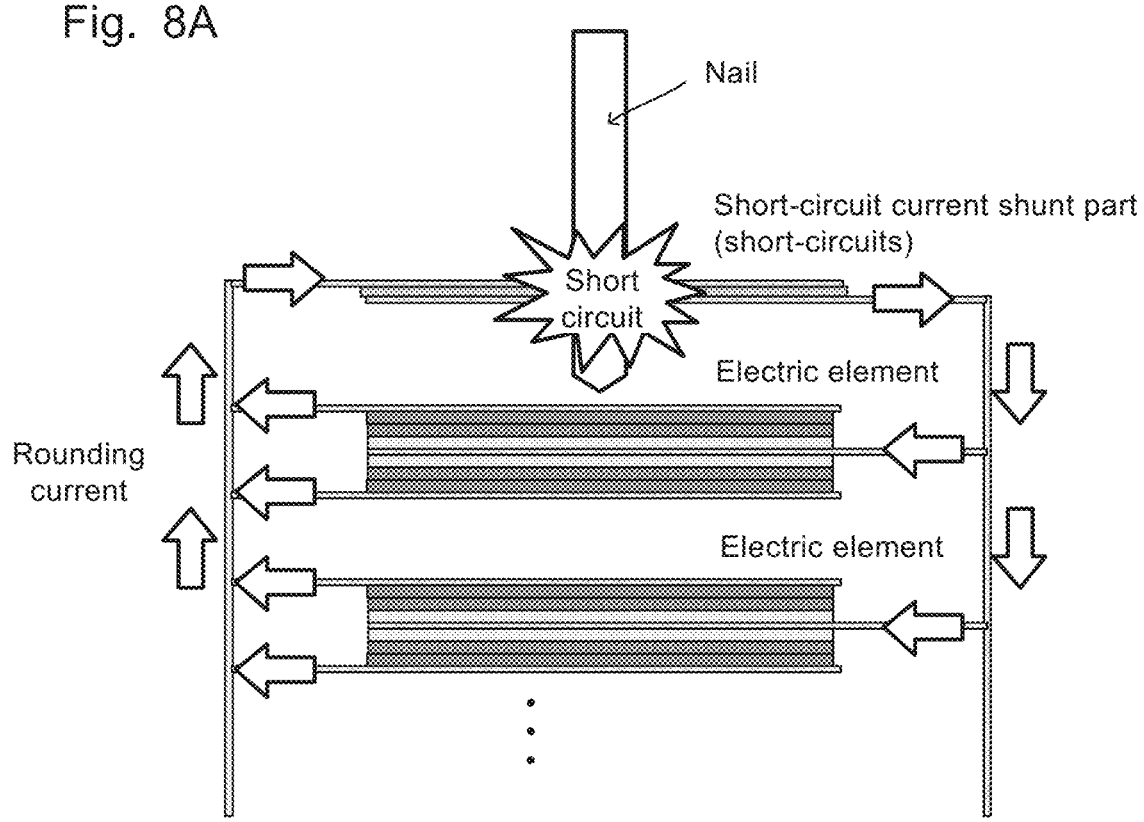
FIGS. 8A and 8B are explanatory schematic views of, for example, a rounding current generated in a stacked battery in nail penetration.
Figure 8B:
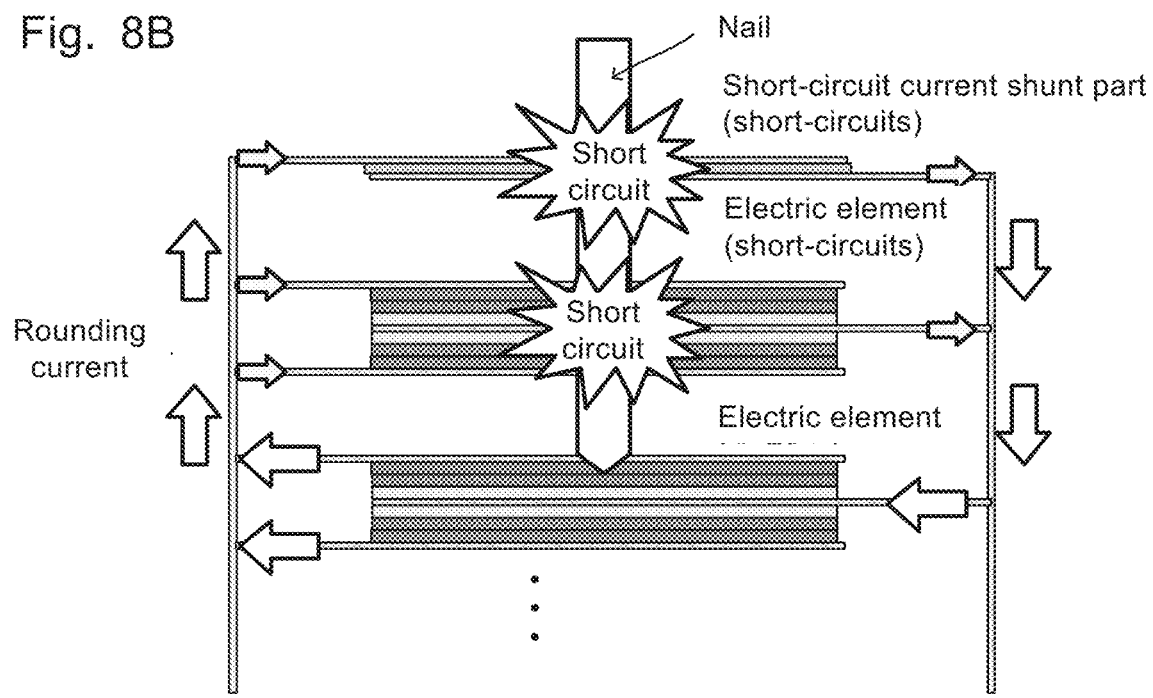

As shown in FIGS. 3A and 3B, the short-circuit current shunt part 10 includes the first current collector layer 11, the second current collector layer 12, and the insulating layer 13 that is provided between the first current collector layer 11 and the second current collector layer 12. When stress such as nail penetration is applied, for example, the first current collector layer 11 and the second current collector layer 12 break through the insulating layer 13 and are in contact with each other, to short-circuit the short-circuit current shunt part 10, which makes it possible to shunt a rounding current from the electric elements 20a and 20b to the short-circuit current shunt part 10 (see FIGS. 8A and 8B). The short-circuit current shunt part 10 shown in FIGS. 3A and 3B is bent when installed in the stacked battery 100, the first part 10a is arranged on one end side in the stacking direction of the stack 20, the second part 10b is arranged on the other end side in the stacking direction of the stack 20, and the third part 10c is arranged on a side face side of the stack 20.

1.1.1. First Current Collector Layer 11 and Second Current Collector Layer 12

The first current collector layer 11 and the second current collector layer 12 may be composed of metal foil, a metal mesh, etc., and are especially preferably composed of metal foil. Examples of metal constituting the first current collector layer 11 and the second current collector layer 12 include Cu, Ni, Al, Fe, Ti, Zn, Co, Cr, Au, Pt and stainless steel. Among them, Cu is preferable from the viewpoint that stable short circuits can occur in nail penetration etc. The first current collector layer 11 and the second current collector layer 12 may have some layer for adjusting contact resistance, over their surfaces. The first current collector layer 11 and the second current collector layer 12 may be constituted of either the same metal, or different metals from each other.

The thickness of each of the first current collector layer 11 and the second current collector layer 12 is not specifically limited and for example, is preferably 0.1 μm to 1 mm, and is more preferably 1 μm to 100 μm. The thickness thereof within such a range makes it possible to contact the current collector layers 11 and 12 to each other more properly and to more properly short-circuit the short-circuit current shunt part 10 especially when stress such as nail penetration is applied.

As shown in FIGS. 1A to 3B, the first current collector layer 11 includes a first tab 11a, and is preferably connected to the cathode current collector layers 21 of the electric elements 20a and 20b electrically via the tab 11a. On the other hand, the second current collector layer 12 includes a second tab 12a, and is preferably connected to the anode current collector layers 25 of the electric elements 20a and 20b electrically via the tab 12a. Material of the tab 11a may be either the same as, or different from that of the first current collector layer 11. Material of the tab 12a may be either the same as, or different from that of the second current collector layer 12.

1.1.2. Insulating Layer 13

In the stacked battery 100, the insulating layer 13 may insulate the first current collector layer 11 from the second current collector layer 12 when the battery is normally used. The insulating layer 13 may be an insulating layer constituted of an organic material, an insulating layer constituted of an inorganic material, or an insulating layer where organic and inorganic materials coexist. Specifically, an insulating layer constituted of an organic material is preferable. This is because an insulating layer constituted of an organic material is advantageous in view of a low probability of occurrence of short circuits due to cracking in normal use compared to an insulating layer constituted of an inorganic material.

Examples of an organic material that may constitute the insulating layer 13 include various resins such as various thermoplastic resins and various thermosetting resins. Specifically, super engineering plastics such as polyimide, polyamide-imide, polyether ether ketone and polyphenylene sulfide are preferable. Generally, thermosetting resin has higher thermal stability, and is harder and brittler than thermoplastic resin. That is, when being constituted of thermosetting resin, the insulating layer 13 easily breaks when a nail is penetrated through the short-circuit current shunt part 10, which makes it possible to suppress the insulating layer 13 from following deformation of the first current collector layer 11 and the second current collector layer 12, to more easily contact the first current collector layer 11 to the second current collector layer 12. In addition, even if the temperature of the insulating layer 13 rises, thermal decomposition can be suppressed. In view of this, the insulating layer 13 is preferably composed of a thermosetting resin sheet, and more preferably composed of a thermosetting polyimide resin sheet.

On the other hand, there is a case where internal short circuits of the battery occur without any application of stress such as nail penetration. In this case, the short-circuit current shunt part still does not short-circuit, it is hard for a rounding current to flow into the short-circuit current shunt part, and current may concentrate in electric elements in which internal short circuits occur to generate heat. Assuming this, short circuits of the short-circuit current shunt part 10 are preferably triggered by heat generation inside the battery. For example, if the insulating layer 13 is to melt when heat is generated in the battery due to internal short circuits of the electric elements etc. while being to insulate the first current collector layer 11 from the second current collector layer 12 when the battery is normally used, short-circuits of the short-circuit current shunt part 10 can be triggered by heat generation inside the battery. From the viewpoint that the insulating layer 13 may melt in the early stage in a case of exceeding a temperature at which the battery is normally used, the insulating layer 13 is preferably constituted of material having a low melting point or grass transition temperature. For example, the melting point or grass transition temperature of material constituting the insulating layer 13 is preferably no more than 145° C., more preferably no more than 140° C., and further preferably no more than 135° C. On the other hand, in order to avoid the insulating layer 13 from melting when the battery is normally used, the melting point or glass transition temperature of material constituting the insulating layer 13 is preferably no less than 105° C., more preferably no less than 110° C., and further preferably no less than 115° C. Examples of such an organic material that may constitute the insulating layer 13 include various resins such as various thermoplastic resins having a low melting point or glass transition temperature including polyethylene and polypropylene. As far as the inventors of the present application found out, polyethylene is the most preferable among thermoplastic resins. Since polyethylene may melt at 115° C. to 135° C. generally, polyethylene may melt in the early stage in the case of exceeding the temperature at which the battery can be normally used while not melting when the battery is normally used. Polyethylene is not limited to a homopolymer of ethylene, but may be a copolymer of ethylene and another monomer as long as satisfying the requirements of the melting point or glass transition temperature.

Examples of an inorganic material that may constitute the insulating layer 13 include various ceramics such as inorganic oxides. The insulating layer 13 may be composed of metal foil that has oxide coating over its surface. For example, aluminum foil that has aluminum oxide coating over its surface as an insulating layer is obtained by anodizing the aluminum foil to form anodic oxide coating over its surface. In this case, the thickness of the aluminum oxide coating is preferably 0.01 μm to 5 μm. The lower limit thereof is more preferably no less than 0.1 μm, and the upper limit thereof is more preferably no more than 1 μm.

The thickness of the insulating layer 13 is not specifically limited, and for example, is preferably 0.1 μm to 1 mm, and is more preferably 1 μm to 100 μm. The thickness of the insulating layer 13 within such a range makes it possible to more properly insulate the first current collector layer 11 from the second current collector layer 12 when the battery is normally used, and leads to more proper continuity between the first current collector layer 11 and the second current collector layer 12 according to deformation due to external stress such as nail penetration, to make it possible to short-circuit the short-circuit current shunt part 10.

1.1.3. First Part 10a, Second Part 10b and Third Part 10c

As shown in FIGS. 1A to 3B, the short-circuit current shunt part 10 has the first part 10a that is provided on one end side in the stacking direction of the stack 20, the second part 10b that is provided on the other end side in the stacking direction of the stack 20, and the third part 10c that connects the first part 10a to the second part 10b. The short-circuit current shunt part 10 includes the first current collector layer 11, the second current collector layer 12, and the insulating layer 13 that is provided between the first current collector layer 11 and the second current collector layer 12, in all the first part 10a, the second part 10b and the third part 10c. The shape and size of the first part 10a may be properly determined according to the shape of the stack 20 on the one end side in the stacking direction. The shape and size of the second part 10b may be properly determined according to the shape of the stack 20 on the other end side in the stacking direction. The shape and size of the third part 10c may be properly determined according to the thickness of the stack 20 in the stacking direction. The first part 10a and the second part 10b may be connected via the third part 10c. Part of the first current collector layer 11, the second current collector layer 12 and the insulating layer 13 which composes the first part 10a; part of the first current collector layer 11, the second current collector layer 12 and the insulating layer 13 which composes the second part 10b; and part of the first current collector layer 11, the second current collector layer 12 and the insulating layer 13 which composes the third part 10c may be constituted of either different materials, or the same material. In view of productivity etc., as shown in FIGS. 3A and 3B, there are preferably no patches between the first part 10a and the third part 10c, and between the second part 10b and the third part 10c.

1.2. Electric Elements 20a and 20b

As shown in FIGS. 4A and 4B, the cathode current collector layer 21, the cathode material layer 22, the electrolyte layer 23, the anode material layer 24, and the anode current collector layer 25 are stacked to form each of the electric elements 20a lea and 20b. In FIGS. 4A and 4B, the electric elements 20a and 20b can individually function as a single cell. In the stacked battery 100, a plurality of such electric elements 20a and 20b are stacked, to compose the stack 20.

1.2.1. Cathode Current Collector Layer 21

The cathode current collector layer 21 may be composed of metal foil, a metal mesh, etc., and is especially preferably composed of metal foil. Examples of metal that constitutes the cathode current collector layer 21 include Ni, Cr, Au, Pt, Al, Fe, Ti, Zn and stainless steel. The cathode current collector layer 21 is especially preferably constituted of Al, which has high electric conductivity, in view of output performance. The cathode current collector layer 21 may have some coating layer for adjusting resistance, over its surface, which is, for example, a coating layer containing a conductive material and resin. The thickness of the cathode current collector layer 21 is not specifically limited, and for example, is preferably 0.1 µm to 1 mm, and is more preferably 1 µm to 100 µm.

As shown in FIGS. 4A and 4B, the cathode current collector layer 21 preferably includes a cathode current collector tab 21a at part of an outer edge thereof. The tab 21a makes it possible to electrically connect the first current collector layer 11 and the cathode current collector layer easily, and to electrically connect the cathode current collector layers 21 to each other easily.

1.2.2. Cathode Material Layer 22

The cathode material layer 22 is a layer containing at least an active material. When the stacked battery 100 is a solid-state battery, the cathode material layer 22 may further contain a solid electrolyte, a binder, a conductive additive, etc. optionally, in addition to an active material. When the stacked battery 100 is a battery of an electrolyte solution system, the cathode material layer 22 may further contain a binder, a conductive additive, etc. optionally, in addition to an active material. A known active material may be used. One may select two materials different in electric potential at which predetermined ions are stored/released (charge/discharge potential) among known active materials, to use a material displaying a noble potential as a cathode active material, and a material displaying a base potential as an anode active material described later. For example, when a lithium ion battery is made, any lithium-containing composite oxide such as lithium cobaltate, lithium nickelate, $LiNi_{1/3}Co_{1/3}Mn_{1/3}O_2$, lithium manganate and a spinel lithium compound may be used as a cathode active material. When the stacked battery 100 is a solid-state battery, a surface of the cathode active material may be coated with an oxide layer such as a lithium niobate layer, a lithium titanate layer and a lithium phosphate layer. When the stacked battery 100 is a solid-state battery, a solid electrolyte is preferably an inorganic solid electrolyte because its ion conductivity is high compared with an organic polymer electrolyte. This is also because an inorganic solid electrolyte has a good heat resistance compared with an organic polymer electrolyte. This is also because pressure applied to the electric elements 20a and 20b when stress such as nail penetration is applied is high compared to the case using an organic polymer electrolyte, which makes the effect of the stacked battery 100 of the present disclosure outstanding. This is further because an inorganic solid electrolyte is hard compared to an organic polymer electrolyte, which makes a constraint pressure applied by a constraining member (not shown) tend to increase and makes the effect of the stacked battery 100 of the present disclosure outstanding. Preferred examples of an inorganic solid electrolyte include oxide solid electrolytes such as lithium lanthanum zirconate, LiPON, $Li_{1+x}Al_xGe_{2-x}(PO_4)_3$, Li—SiO based glass and Li—Al—S—O based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$ and $Li_2S$—$P_2S_5$—$GeS_2$. Especially, a sulfide solid electrolyte is preferable, a sulfide solid electrolyte containing $Li_2S$—$P_2S_5$ is more preferable, and a sulfide solid electrolyte containing $Li_2S$—$P_2S_5$—LiI—LiBr is further preferable. Examples of a binder that may be contained in the cathode material layer 22 include butadiene rubber (BR), butylene rubber (IIR), acrylate-butadiene rubber (ABR) and polyvinylidene difluoride (PVdF). Examples of a conductive additive that may be contained in the cathode material layer 22 include carbon materials such as acetylene black and Ketjenblack, and metallic materials such as nickel, aluminum and stainless steel. The contents of the constituents in the cathode material layer 22 may be the same as in a conventional one. The shape of the cathode material layer 22 may be the same as a conventional one as well. Specifically, from the viewpoint that the stacked battery 100 can be easily made, the cathode material layer 22 in the form of a sheet is preferable. In this case, the thickness of the cathode material layer 22 is, for example, preferably 0.1 µm to 1 mm, and more preferably 1 µm to 150 µm.

1.2.3. Electrolyte Layer 23

The electrolyte layer 23 is a layer containing at least an electrolyte. When the stacked battery 100 is a solid-state battery, the electrolyte layer 23 may be a solid electrolyte layer containing a solid electrolyte, and optionally a binder. This solid electrolyte is preferably an inorganic solid electrolyte described above. Especially, when the stacked battery 100 is a sulfide solid-state battery, the electrolyte layer 23 preferably contains a sulfide solid electrolyte. In this case, a sulfide solid electrolyte contained in the electrolyte layer 23 is preferably a sulfide solid electrolyte containing $Li_2S$—$P_2S_5$, and more preferably a sulfide solid electrolyte containing $Li_2S$—$P_2S_5$—LiI—LiBr. The binder same as one used in the cathode material layer 22 may be properly selected to be used. The contents of the constituents in the solid electrolyte layer 23 may be the same as in a conventional one. The shape of the solid electrolyte layer 23 may be the same as a conventional one as well. Specifically, from the viewpoint that the stacked battery 100 can be easily made, the solid electrolyte layer 23 in the form of a sheet is preferable. In this case, the thickness of the solid electrolyte layer 23 is, for example, preferably 0.1 µm to 1 mm, and more preferably 1 µm to 100 µm. On the other hand, when the stacked battery 100 is a battery of an electrolyte solution system, the electrolyte layer 23 includes an electrolyte solution and a separator. These electrolyte solution and separator are obvious for the person skilled in the art, and thus detailed description thereof is omitted here. The electrolyte layer 23 is preferably a solid electrolyte layer. That is, the stacked battery 100 is preferably a solid-state battery, and especially preferably a sulfide solid-state battery.

1.2.4. Anode Material Layer 24

The anode material layer 24 is a layer containing at least an active material. When the stacked battery 100 is a solid-state battery, the anode material layer 24 may further contain a solid electrolyte, a binder, a conductive additive, etc. optionally, in addition to an active material. When the stacked battery 100 is a battery of an electrolyte solution system, the anode material layer 24 may further contain a binder, a conductive additive, etc. optionally, in addition to an active material. A known active material may be used. One may select two materials different in electric potential at which predetermined ions are stored/released (charge/discharge potential) among known active materials, to use a material displaying a noble potential as a cathode active material described above, and a material displaying a base potential as an anode active material. For example, when a lithium ion battery is made, a silicon-based active material such as Si, Si alloys and silicon oxide; a carbon-based active material such as graphite and hard carbon; any oxide-based active material such as lithium titanate; lithium metal or a lithium alloy; or the like may be used as an anode active material. A solid electrolyte, a binder, and a conductive additive may be properly selected from ones that are the examples as those used in the cathode material layer 22, to be used. The contents of the constituents in the anode material layer 24 may be the same as in a conventional one. The shape of the anode material layer 24 may be the same as a conventional one as well. Specifically, from the viewpoint that the stacked battery 100 can be easily made, the anode material layer 24 in the form of a sheet is preferable. In this case, the thickness of the anode material layer 24 is, for example, preferably 0.1 μm to 1 mm and more preferably 1 μm to 100 μm. Preferably, the thickness of the anode material layer 24 is determined such that the capacity of an anode is larger than that of a cathode.

1.2.5. Anode Current Collector Layer 25

The anode current collector layer 25 may be composed of metal foil, a metal mesh, etc., and is especially preferably composed of metal foil. Examples of metal that constitutes the anode current collector layer 25 include Cu, Ni, Fe, Ti, Co, Zn and stainless steel. The anode current collector layer 25 is especially preferably constituted of Cu. The anode current collector layer 25 may have some coating layer for adjusting resistance, over its surface, which is, for example, a coating layer containing a conductive material and resin. The thickness of the anode current collector layer 25 is not specifically limited, and for example, is preferably 0.1 μm to 1 mm, and is more preferably 1 μm to 100 μm.

As shown in FIGS. 4A and 4B, the anode current collector layer 25 preferably includes an anode current collector tab 25a at part of an outer edge thereof. The tab 25a makes it possible to electrically connect the second current collector layer 12 to the anode current collector layer 25 easily, and to electrically connect the anode current collector layers 25 to each other easily.

1.3. Arrangement of Electric Elements

In the stack 20, the number of stacking the electric elements 20a and 20b is not specifically limited, and may be properly determined according to the power of the battery to be aimed. In this case, a plurality of the electric elements may be stacked either so as to be directly in contact with each other, or via some layers (for example, insulating layers) or spaces (air spaces). In view of improving the power density of the battery, preferably, a plurality of the electric elements are stacked so as to be directly in contact with each other. As shown in FIGS. 2, 4A and 4B, two electric elements 20a and 20b preferably share the anode current collector 25, which further improves the power density of the battery. Further, as shown FIGS. 2, 4A and 4B, the direction of stacking the cathode current collector layer 21, the cathode material layer 22, the electrolyte layer 23, the anode material layer 24, and the anode current collector layer 25 in each of the electric elements 20a and 20b is preferably the same as that of stacking a plurality of the electric elements 20a and 20b in the stack 20, which makes it easy to, for example, constrain the stacked battery 100, to further improve the power density of the battery.

1.4 Electric Connection of Electric Elements With Each Other

As shown in FIGS. 1A to 2, the stacked battery 100 includes a plurality of the electric elements 20a and 20b. A plurality of the electric elements 20a and 20b may be electrically connected either in series or in parallel. Especially preferably, a plurality of the electric elements 20a and 20b are electrically connected to each other in parallel. In the electric elements connected in parallel as described above, when one electric element short-circuits, electrons concentratedly flow into the one electric element from the other electric elements. That is, Joule heating is easy to be high when the battery short-circuits. In other words, in the stacked battery 100 including a plurality of the electric elements 20a and 20b connected in parallel, the effect of providing the short-circuit current shunt part 10 is more outstanding. A conventionally known member may be used as a member for electrically connecting the electric elements to each other. For example, as described above, one may provide the cathode current collector tabs 21a for the cathode current collector layers 21, and the anode current collector tabs 25a for the anode current collector layers 25, to electrically connect a plurality of the electric elements 20a and 20b to each other in parallel via the tabs 21a and 25a.

1.5. Electric Connection of Short-Circuit Current Shunt Part and Electric Elements In the stacked battery 100, the first current collector layer 11 of the short-circuit current shunt part 10 is electrically connected to the cathode current collector layer 21 of each of the electric elements 20a and 20b, and the second current collector layer 12 of the short-circuit current shunt part 10 is electrically connected to the anode current collector layers 25 of each of the electric elements 20a and 20b. More specifically, as shown in FIGS. 1A to 2, the short-circuit current shunt part 10 has the first part 10a that is provided on one end side in the stacking direction of the stack 20, the second part 10b that is provided on the other nd side in the stacking direction of the stack 20, and the third part 10c that connects the first part 10a and the second part 10b. At the first part 10a, while the first current collector layer 11 and the cathode current collector layers 21 have the electric connection part 14a, the second current collector layer 12 and the anode current collector layers 25 do not have any electric connection part. At the second part 10b, while the second current collector layer 12 and the anode current collector layers 25 have the electric connection part 14b, the first current collector layer 11 and the cathode current collector layers 21 do not have any electric connection part. At the third part 10c, the first current collector layer 11, the second current collector layer 12, the cathode current collector layers 21, and the anode current collector layers 25 do not have any electric connection part. In other words, the short-circuit current shunt part 10 is electrically connected only to the cathode of the stack 20 at the first part 10a, and only to the anode of the stack 20 at the second part 10b, but not electrically connected to the stack 20 at the third part 10c.

A conventionally known member may be used as a member for electrically connecting the short-circuit current shunt part 10 with the electric elements 20a and 20b. For example, the short-circuit current shunt part 10 may be electrically connected with the electric elements 20a and 20b via tabs. That is, as shown in FIGS. 1A to 2, preferably, the short-circuit current shunt part 10 includes the first tab 11a protruding from the first current collector layer 11 at the first part 10a and the second tab 12a protruding from the second current collector layer 12 at the second part 10b; each of the electric elements 20a and 20b includes the cathode tab 21a protruding from the cathode current collector layer 21, and the ode tab 25a protruding from the anode current collector layer 25; at the first part 10a, the first tab 11a is electrically connected to the cathode tabs 21a, and at the second part 10b, the second tab 12a is electrically connected to the anode tab 25a.

1.6. Positional Relationship Between Short-Circuit Current Shunt Part and Stack

As described above, the short-circuit current shunt part 10 has the first part 10a that is provided on one end side in the stacking direction of the stack 20, the second part 10b that is provided on the other end side in the stacking direction of the stack 20, and the third part 10c that connects the first part 10a to the second part 10b. The short-circuit current shunt part 10 is preferably arranged on an outer side than the stack 20. In other words, in the stacked battery 100, if an external case (not shown) that stores the short-circuit current shunt part 10 and the stack 20 is provided, the short-circuit current shunt part 10 is preferably provided between the stack 20 and the external case. When a nail penetration test is assumed, since the short-circuit current shunt part 10 is arranged on an outer side than the stack 20, a nail runs through the short-circuit current shunt part 10 before the stack 20, which makes it possible to properly short-circuit the short-circuit current shunt part 10 prior to the stack 20, to generate a rounding current from the stack 20 to the short-circuit current shunt part 10, and further, to suppress heat generation inside the stack 20. As shown in FIGS. 1A to 2, the short-circuit current shunt part 10 extends as bending from the one end side to the other end side in the stacking direction of the stack 20, and preferably covers the one and other end sides in the stacking direction of the stack 20, and a side face of the stack 20. Here, the short-circuit current shunt part 10 may be either directly stacked on a surface of the stack 20, or indirectly stacked via other layers (such as an insulating layer and a heat insulating layer). As shown in FIGS. 2, 4A and 4B, the following directions are preferably the same: the direction of stacking the first current collector layer 11, the insulating layer 13, and the second current collector layer 12 at the first part 10a and the second part 10b of the short-circuit current shunt part 10, the direction of stacking the cathode current collector layer 21, the cathode material layer 22, the electrolyte layer 23, the anode material layer 24, and the anode current collector layer 25 in each of the electric elements 20a and 20b, and the direction of stacking a plurality of the electric elements 20a and 20b in the stack 20. This makes it easy to, for example, constrain the stacked battery 100, and further improves the power density of the battery.

1.7. Relation Between Short-Circuit Current Shunt Part and Electric Elements in Size In the stacked battery 100, the short-circuit current shunt part 10 covers as much part of the stack 20 as possible, which makes it easy to short-circuit the short-circuit current shunt part 10 prior to the stack 20 in nail penetration. In view of this, for example, in the stacked battery 100, all the periphery of the short circuit current shunt part 10 is preferably present on an outer side than the outer edges of the stack 20 in the first part 10a and the second part 10b of the short-circuit current shunt part 10 when viewed in the stacking direction of the stack 20. Alternatively, when the direction of stacking a plurality of the electric elements 20a and 20b in the stack 20 is the same as that of stacking the layers 21 to 25 in each of the electric elements 20a and 20b, all the periphery of the short-circuit current shunt part 10 is preferably present on an outer side than the outer edges of the cathode material layers 22, the electrolyte layers 23, and the anode material layers 24 in the first part 10a and the second part 10b of the short-circuit current shunt part 10 when viewed in the stacking direction of the stack 20. In this case, the first current collector layer 11 of the short-circuit current shunt part 10 and the anode current collector layers 25 of the electric elements 20a and 20b may not short-circuit. For example, preferably, an insulator or the like is provided between the short-circuit current shunt part 10 and the stack 20, so that short circuits of the short-circuit current shunt part 10 and the electric elements 20a and 20b can be prevented even if the short-circuit current shunt part 10 is enlarged.

In contrast, from the viewpoints that the energy density of the battery is improved more and that short circuits of the short-circuit current shunt part 10 and the electric elements due to their contact as described above can be easily prevented, the short-circuit current shunt part 10 may be shrunk. That is, in view of them, in the stacked battery 100, part of the outer edges of the short-circuit current shunt part 10 is preferably present on an inner side than the outer edges of the stack 20 when viewed in the stacking direction of the stack 20. Alternatively, when the direction of stacking a plurality of the electric elements 20a and 20b in the stack 20 is the same as that of stacking the layers 21 to 25 in the electric elements, part of the outer edges of the short-circuit current shunt part 10 is preferably present on an inner side than the outer edges of the cathode material layers 22, the electrolyte layers 23, and the anode material layers 24 when viewed in the stacking direction of the stack 20. It is noted that in the stacked battery 100 shown in FIGS. 1A to 2, the third part 10c of the short-circuit current shunt part. 10 is present on an outer side than the outer edges of the stack 20 when viewed in the stacking direction of the stack 20.

1.8. Function and Effect

Assuming that short circuits occur at the first part 10a of the short-circuit current shunt part 10 in the stacked battery 100 as shown in FIG. 5A. In this case, electrons flow from the anode current collector layers 25 of the stack 20 via the connection part 14b into the second current collector layer 12 of the second part 10b, flow, in order, to the second part 10b, the third part 10c, and the first part 10a, further at the first part 10a, flow from the second current collector layer 12 via the short-circuiting portion into the first current collector layer 11, and flow from the first current collector layer 11 via the connection part 14a to the cathode current collector layers 21 of the stack 20. That is, electrons flowing from the anode of the stack 20 into the short-circuit current shunt part 10 result in flowing to the cathode of the stack 20 as detouring via the second part 10b, the third part 10c, and the first part 10a.

On the other hand, as shown in FIG. 5B, in a prior art, a first current collector layer and a second current collector layer of a short-circuit current shunt part is connected to a cathode and an anode of a stack respectively on one side in the stacking direction of the stack. When part of the short-circuit current shunt part short-circuits, electrons flow from an anode current collector of the stack via the short-circuit current shunt part into a cathode current collector of the stack on one side in the stacking direction of the stack.

That is, a current path passing in the stacked battery 100 when the short-circuit current shunt part short-circuits is longer than that in a prior art. This brings gradual heat generation a large area of the short-circuit current shunt part 10 (that is, generated heat is spread over a large area) due to a long current path, and makes it possible to radiate heat from a large area of the short-circuit current shunt part 10. A long current path leads to a high resistance and a low current, which makes a heat generation value of the short-circuit current shunt part 10 itself small. Further, since the area of the short-circuit current shunt part in the stacked battery 100 is larger than that in a prior art, a heat capacity of the short-circuit current shunt part can be improved in the stacked battery 100 more than before. In view of these, according to the stacked battery 100 of this disclosure, when the short-circuit current shunt part 10 short-circuits due to nail penetration or the like and current flows from the electric elements 20a and 20b into the short-circuit current shunt part 10, heat generation in the short-circuit current shunt part 10 can be suppressed more than before. In the stacked battery 100, since the third part 10c of the short-circuit current shunt part 10 is provided on a side face side of the stack 20, a certain effect can be brought about not only for nail penetration in the stacking direction but also for nail penetration in a direction orthogonal to the stacking direction.

2. Stacked Battery 200

Figure 6:
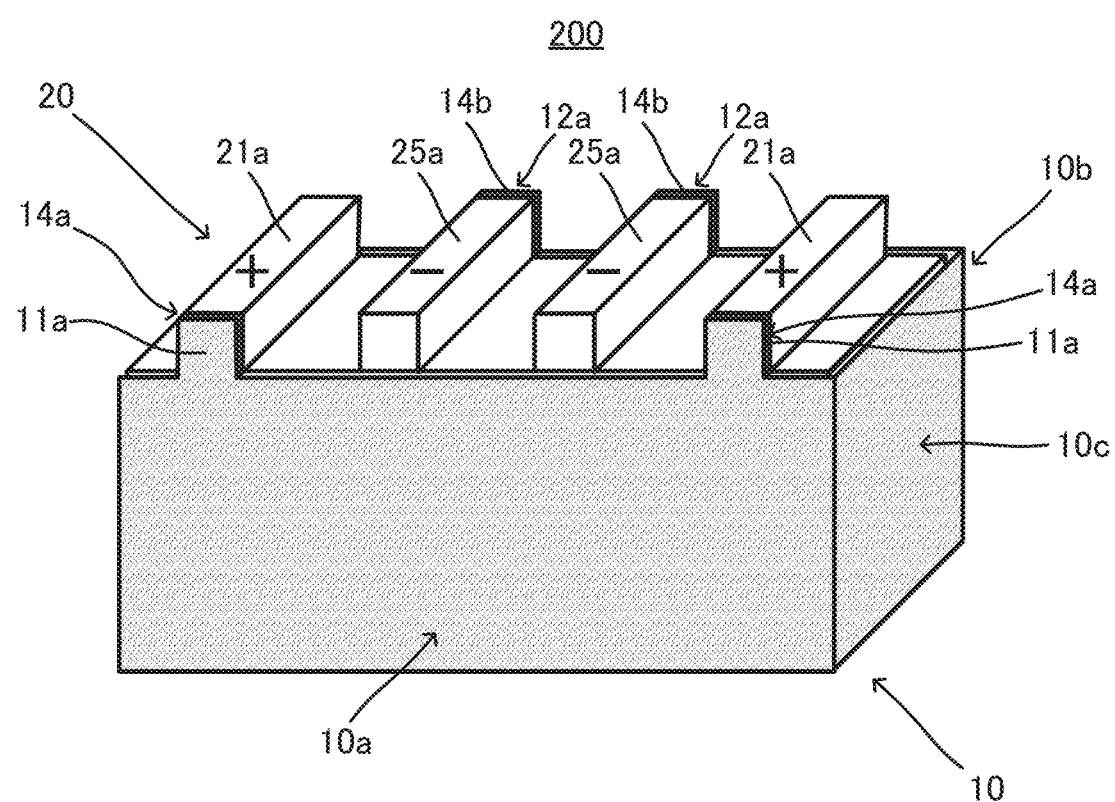
FIG. 6 is an explanatory schematic view of structure of a stacked battery 200, where the first part 10a is on the front side.
Figure 7:
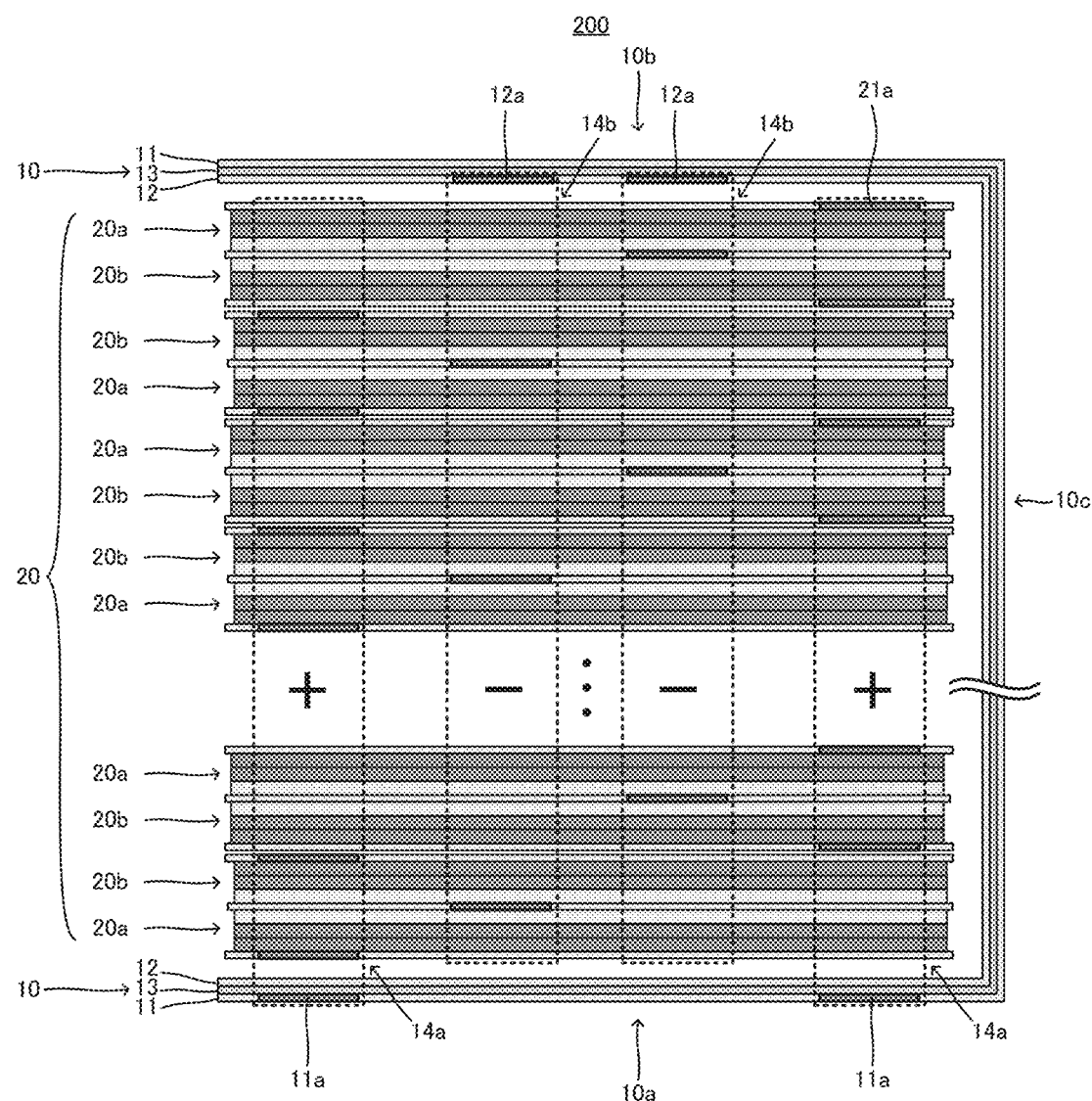
FIG. 7 is an explanatory schematic view of the structure of the stacked battery 200.

FIGS. 6 and 7 show a stacked battery 200 that includes a plurality of connection parts 14a and a plurality of the connection parts 14b. In the stacked battery 200, the same members as those in the stacked battery 100 are given the same reference signs, and description thereof is properly omitted.

As shown in FIG. 6, the stacked battery 200 includes a plurality of the connection parts 14a (two) at the first part 10a, and a plurality of the connection parts 14b (two) at the second part 10b. Specifically, as shown in FIG. 7, in the stack 20 of the stacked battery 200, the odd-numbered electric elements 20a and 20b face opposite the even-numbered electric elements 20a and 20b when counted from one end in the stacking direction. A plurality of the odd-numbered electric elements 20a and 20b are electrically connected to each other, and a plurality of the even-numbered electric elements 20a and 20b are electrically connected to each other while the odd-numbered electric elements 20a and 20b are not electrically connected to the even-numbered electric elements 20a and 20b. Alternating faces of the electric elements 20a and 20b as described above to stack a plurality of the electric elements 20a and 20b makes a distance between tabs protruding from the stack 20 long. That is, the tabs can be avoided from being dense, and a conductive member or the like is easy to be held between the tabs.

As described above, the number of the connection parts 14a at the first part 10a of the short-circuit current shunt part 10 is not limited to one. The number of the connection parts 14b at the second part 10b of the short-circuit current shunt part 10 is not limited to one as well. Like the stacked battery 200, a plurality of the connection parts 14a and 14b may be provided for the first part 10a and the second part 10b. In this case, the above described function and effect are also brought about.

3. Method for Producing Stacked Battery

The short-circuit current shunt part 10 can be easily made by arranging the insulating layer 13 (for example, a predetermined insulating sheet) between the first current collector layer 11 (for example, predetermined metal foil) and the second current collector layer 12 (for example, predetermined metal foil). For example, the insulating layer 13 is arranged over at least one face of the second current collector layer 12, and the first current collector layer 11 is further arranged over a face of the insulating layer 13 which is on the opposite side of the second current collector layer 12. Here, the layers of the short-circuit current shunt part 10 may be stuck to each other using adhesive, resin, or the like in order to keep its shape. In this case, it is not necessary for adhesive or the like to be applied all over the faces of the layers, but adhesive or the like may be applied to part of a surface of each layer.

The electric elements 20a and 20b can be made by a known method. For example, when a solid-state battery is produced, one may coat a surface of the cathode current collector layer 21 with a cathode material in a wet process to dry the surface, to form the cathode material layer 22, coat a surface of the anode current collector layer 25 with an anode material in a wet process to dry the surface, to form the anode material layer 24, transfer the electrolyte layer 23 containing a solid electrolyte etc. between the cathode material layer 22 and the anode material layer 24, and integrally press-mold the layers, which makes it possible to make each of the electric elements 20a and 20b. A pressing pressure at this time is not limited, and for example, is preferably no less than 2 ton/cm$^2$. These making procedures are just an example, and the electric elements 20a and 20b can be made by any procedures other than them. For example, the cathode material layer etc. can be formed by a dry process instead of a wet process. The stack 20 is obtained by stacking a plurality of the electric elements 20a and 20b made as described above.

While being bent, the short-circuit current shunt part 10 made as described above is stacked so that the first part 10a and the second part 10b of the short-circuit current shunt part 10 sandwich the stack 20. In addition, the tab 11a provided for the first current collector layer 11 is connected with the cathode current collector layers 21, and the tab 12a provided for the second current collector layer 12 is connected with the anode current collector layers 25, which makes it possible to electrically connect the short-circuit current shunt part 10 and the electric elements 20a and 20b. In the stack 20, the tabs 21a of the cathode current collector layers 21 of a plurality of the electric elements 20a and 20b are connected with each other, and the tabs 25a of the anode current collector layers 25 thereof are connected with each other, which makes it possible to electrically connect a plurality of the electric elements 20a and 20b with each other. The short-circuit current shunt part 10 and the stack 20 which are electrically connected as described above are, for example, sealed in an external case (battery case) of a laminate film, a stainless steel can, or the like while optionally constrained by a constraining member or the like, which makes it possible to make a solid-state battery as the stacked battery. These making procedures are just an example, and a solid-state battery can be made by any procedures other than them.

Alternatively, for example, the electric elements 20a and 20b are made by arranging a separator instead of the solid electrolyte layer, and the stack 20 is held by the short-circuit current shunt part 10 as described above, thereafter is constrained optionally by a constraining member, and is sealed up in an external case (battery case) that is filled with an electrolyte solution, which makes it possible to produce an electrolyte solution-based battery as the stacked battery. When an electrolyte solution based battery is produced, press-molding of the layers may be omitted.

As described above, the stacked battery 100 of the present disclosure can be easily produced by applying a conventional method for producing a battery.

4. Additional Notes

The description showed the embodiment of composing the short-circuit current shunt part of one first current collector layer, one insulating layer, and one second current collector layer. The stacked battery of the present disclosure is not restricted to this embodiment. The short-circuit current shunt part may include some insulating layer between the first and second current collector layers, and the numbers of the layers are not specifically limited. For example, the structure thereof may be the first current collector layer/the insulating layer/the second current collector layer/the insulating layer/the first current collector layer.

The description showed such an embodiment that the first current collector layer of the short-circuit current shunt part is arranged on the outer side (inner wall side of a battery case) and the second current collector layer thereof is arranged on the inner side (stack side) in a state where the short-circuit current shunt part is installed in the stacked battery. However, the stacked battery of this disclosure is not limited to this embedment. The second current collector layer may be on the outer side, and the first current collector layer may be on the inner side.

The description showed the embodiment of providing only one short-circuit current shunt part on the outside with respect to the direction of stacking a plurality of the electric elements in the stacked battery. The number of the short-circuit current shunt parts is not limited to this. A plurality of the short-circuit current shunt parts may be provided outside the stack in the stacked battery. One more short-circuit current shunt part may be provided inside the stack (between a plurality of the electric elements) in addition to the short-circuit current shunt part that is provided outside the stack.

The description showed such an embodiment that two electric elements share one anode current collector layer. The stacked battery of the present disclosure is not restricted to this embodiment. The electric elements may individually function as a single cell where the cathode current collector layer, the cathode material layer, the solid electrolyte layer, the anode material layer, and the anode current collector layer are stacked. For example, the stacked battery of this disclosure may include such embodiments that two electric elements share one cathode current collector layer, and that a plurality of the electric elements do not share any current collector layer, but are individually present.

The description showed the embodiment of stacking a plurality of the electric elements. A certain effect is believed to be brought about even in such an embodiment that a plurality of the electric elements are not stacked in the stacked battery (embodiment of including only one single cell). However, Joule heating due to short circuits tends to be larger in the embodiment of stacking a plurality of the electric elements than in the embodiment of including one electric element. That is, it can be said that the effect of providing the short-circuit current shunt part is more outstanding in the embodiment of stacking a plurality of the electric elements. Thus, the stacked battery of the present disclosure shall include a plurality of the electric elements.

In the description, the current collector tabs protrude from the short-circuit current shunt part and the electric elements. However, the stacked battery of the present disclosure does not necessarily include any current collector tab. For example, current collector layers of large areas are used, outer edges of a plurality of the current collector layers are allowed to protrude in the stack of the short-circuit current shunt part and the electric elements, and a conductive member is held between the protruding current collector layers, which makes it possible to electrically connect the current collector layers with each other without any tabs provided. Alternatively, the current collector layers may be electrically connected with each other via conductor wires or the like instead of tabs. In view of easier electric connection, tabs are preferably provided for the short-circuit current shunt part and the electric elements.

The description showed the stacked battery including both an electrolyte solution based battery and a solid-state battery. It is believed that the technique of the present disclosure exerts a more outstanding effect when applied to a solid-state battery where the electrolyte layer is a solid electrolyte layer (especially a sulfide solid-state battery whose solid electrolyte layer contains a sulfide solid electrolyte). That is, gaps in the electric elements are small and pressure applied to the electric elements when a nail penetrates through the electric elements in nail penetration is high in a solid-state battery compared to an electrolyte solution based battery. Thus, it is believed that the shunt resistance of the short-circuit current shunt part (and the shunt resistance of the electric elements) becomes low, and most current flows into the short-circuit current shunt part (and some electric elements). Moreover, in a solid-state battery, a constraint pressure to the stack tends to be high in order to lower the internal resistance in the electric elements. In this case, since a constraint pressure is applied in the direction of stacking the electric elements (direction from the cathode current collector layers toward the anode current collector layers) and in nail penetration, pressure by a nail and the constraint pressure are summed to apply to the electric elements, it is believed to be easy to contact the current collector layers to short-circuit, and easy to lower the shunt resistance of the electric elements (that is, when electric elements short-circuit, a heat generation value is easy to be large). Therefore, it is believed that the effect of providing the short-circuit current shunt part to shunt a rounding current is outstanding. In contrast, a battery case of an electrolyte solution based battery is generally filled with an electrolyte solution, the layers are immersed in the electrolyte solution, and the electrolyte solution is supplied to a gap between each layer. Pressure applied by a nail in nail penetration tends to be low compared with the case of a solid-state battery. Therefore, the effect of providing the short-circuit current shunt part in an electrolyte solution based battery is believed to be relatively small compared to the case of a solid-state battery. In the case of an electrolyte solution based battery, the short-circuit current shunt part may be in contact with the electrolyte solution according to the structure of the battery. In this case, metal constituting the short-circuit current shunt part may dissolve in the electrolyte solution as ions at charge/discharge potentials of electrodes. That is, there is a case where in an electrolyte solution based battery, contact of the short-circuit current shunt part and the electrolyte solution may suppress the function of the short-circuit current shunt part. Even in this point, the technique of this disclosure is preferably used for a solid-state battery.

When the electric elements are electrically connected with each other in series using a bipolar electrode or the like, it is believed that if a nail penetrates through some electric elements, current flows via the nail from the other electric elements to some electric elements. That is, the current flows via the nail, which has a high contact resistance, and the flow thereof is small. In this point, it is believed that heat generation in the battery in internal short circuits is small and the effect of the short-circuit current shunt part is small compared with the case where the electric elements are electrically connected in parallel. Thus, in the stacked battery of this disclosure, the electric elements are preferably connected with each other electrically in parallel in view of exerting a more outstanding effect.

INDUSTRIAL APPLICABILITY

The stacked battery according to this disclosure can be preferably used in a wide range of power sources such as a small-sized power source for portable devices and an onboard large-sized power source.

REFERENCE SIGNS LIST 10 short-circuit current shunt part
10a first part
10b second part
10c third part
11 first current collector layer
11a first tab
12 second current collector layer
12a second tab
13 insulating layer
14a connection part
14b connection part
20 stack
20a, 20b electric element
21 cathode current collector layer
21a cathode current collector tab
22 cathode material layer
23 electrolyte layer
24 anode material layer
25 anode current collector layer
25a anode current collector tab
100 stacked battery

What is claimed is:

1. A stacked battery comprising at least one short-circuit current shunt part, and a stack that comprises a plurality of electric elements which are stacked, wherein
the short-circuit current shunt part comprises a first current collector layer, a second current collector layer, and an insulating layer provided between the first current collector layer and the second current collector layer, all of the layers being stacked,
each of the electric elements comprises a cathode current collector layer, a cathode material layer, an electrolyte layer, an anode material layer, and an anode current collector layer, all of the layers being stacked,
said at least one short-circuit current shunt part has a first part that is provided on one end side in a stacking direction of the stack, a second part that is provided on another end side in the stacking direction of the stack, and a third part that connects the first part and the second part,
at the first part, the first current collector layer and the cathode current collector layer have an electric connection part but the second current collector layer and the anode current collector layer do not have any electric connection part,
at the second part, the second current collector layer and the anode current collector layer have an electric connection part but the first current collector layer and the cathode current collector layer do not have any electric connection part, and
at the third part, the first current collector layer, the second current collector layer, the cathode current collector layer, and the anode current collector layer do not have any electric connection part.

2. The stacked battery according to claim 1, wherein
said at least one short-circuit current shunt part includes a first tab at the first part, the first tab protruding from the first current collector layer, and a second tab at the second part, the second part protruding from the second current collector layer,
each of the electric elements includes a cathode tab that protrudes from the cathode current collector layer, and an anode tab that protrudes from the anode current collector layer,
at the first part, the first tab and the cathode tab are electrically connected to each other, and
at the second part, the second tab and the anode tab are electrically connected to each other.

3. The stacked battery according to claim 1, the stacked battery being a solid-state battery.

4. The stacked battery according to claim 1, wherein the electrolyte layer contains a sulfide solid electrolyte as a solid electrolyte.

5. The stacked battery according to claim 1, wherein a plurality of the electric elements are electrically connected with each other in parallel.

6. The stacked battery according to claim 1, wherein the following directions are the same:
a direction of stacking the first current collector layer, the insulating layer, and the second current collector layer in the first part and the second part of the short-circuit current shunt part,
a direction of stacking the cathode current collector layer, the cathode material layer, the electrolyte layer, the anode material layer, and the anode current collector layer in each of the electric elements, and
the direction of stacking a plurality of the electric elements in the stack.

* * * * *